United States Patent [19]
Cantral

[11] 3,734,195
[45] May 22, 1973

[54] SIDE DRAFT CONTROL SYSTEM FOR A TRACTOR AND EARTH-WORKING IMPLEMENT

[75] Inventor: John Isaac Cantral, Moline, Ill.

[73] Assignee: Deere & Company, Moline, Ill.

[22] Filed: May 17, 1971

[21] Appl. No.: 143,939

[52] U.S. Cl. ...................172/7, 172/7, 172/239, 172/413, 172/421
[51] Int. Cl. ...........................................A01b 63/112
[58] Field of Search....................178/9, 7, 8, 4.5, 178/239, 413, 450, 421, 451, 311, 316; 280/461 A, 446 R; 60/97 E; 91/171

[56] References Cited

UNITED STATES PATENTS

| | | | |
|---|---|---|---|
| 2,755,722 | 7/1956 | Fraga | 172/239 |
| 3,523,699 | 8/1970 | Sinkule et al. | 172/311 X |
| 3,630,290 | 12/1971 | Williams et al. | 172/7 |
| 3,233,909 | 2/1966 | Boone | 172/4.5 |
| 3,627,053 | 12/1971 | Hook et al. | 178/9 |
| 2,883,777 | 4/1959 | Gurries et al. | 172/4.5 |
| 3,627,059 | 12/1971 | Jackson et al. | 172/413 |
| 3,120,799 | 2/1964 | Strnad et al. | 60/97 E |
| 2,782,703 | 2/1957 | Chambers et al. | 172/7 |

*Primary Examiner*—Robert E. Pulfrey
*Assistant Examiner*—Stephen C. Pellegrino
*Attorney*—H. Vincent Harsha, Harold M. Knoth, William A. Murray, John M. Nolan, Raymond L. Hollister, Jimmie R. Oaks and John O. Hayes

[57] ABSTRACT

A side draft control device for wide implements automatically adjusts implement wheels to raise the high draft side of the implement and lower the low draft side of the implement to maintain a balanced draft load on the tractor and an average working depth of the implement. The system uses lateral movement of the draft links to operate a control valve which selectively and alternately interconnects the cylinders for the implement wheels with the tractor hydraulic pump and reservoir.

15 Claims, 4 Drawing Figures

INVENTOR.
JOHN I. CANTRAL

BY R L Hollister
ATTORNEY

INVENTOR.
JOHN I. CANTRAL

SIDE DRAFT CONTROL SYSTEM FOR A TRACTOR AND EARTH-WORKING IMPLEMENT

CROSS REFERENCE TO RELATED APPLICATION

The present application is related to and contains subject matter common to U. S. application Ser. No. 143,890, filed concurrently herewith.

BACKGROUND OF THE INVENTION

The present invention relates generally to earth-working implements and more particularly relates to the control of draft forces on the implement.

The current trend in agricultural implements is to make the implement wider so that a larger area of ground can be worked with one pass through the field. The use of wide implements has presented problems controlling draft forces. For example, on a wide integral implement there is a good chance that one side of the implement may work deeper than the other due to irregularities in the ground contour. Also, the wider the implement the greater the possibility that the tools on one side of the implement will be working in harder ground than the tools on the other side. These conditions create unbalanced draft loads on a tractor and render it impossible to make straight rows. Attempts have been made to overcome these problems by controlling the working depth of the tools on the implement by gauge wheels on the outer ends of the implement. However, when the tools on one side of the implement are working in harder ground than the tools on the other side of the implement, there are still unbalanced draft loads imposed upon the tractor.

SUMMARY OF THE INVENTION

The principal object of the present invention is to provide a side draft control system which automatically maintains balanced draft loads on a tractor.

An additional object of the present invention is to provide a side draft control system which maintains a substantially constant average working depth of the implement while maintaining substantially balanced draft loads on a tractor.

A further object of the present invention is to provide a side draft control system for an agricultural implement which is responsive to unbalanced draft loads on a tractor to raise the high draft side of the implement and simultaneously lower the load draft side of the implement to balance the draft load on the tractor.

Still another object of the present invention is to provide a side draft control system for a tractor and implement arrangement which is responsive to lateral movement of the tractor hitch links caused by unequal draft forces on opposite sides of the tractor hitch to interconnect hydraulic cylinders controlling the position of the implement on gauge wheels adjustably secured to the implement on opposite sides of the tractor hitch with a source of fluid pressure and a fluid reservoir on the tractor so that the high draft side of the implement is raised and the low draft side of the implement is lowered.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figure 1:
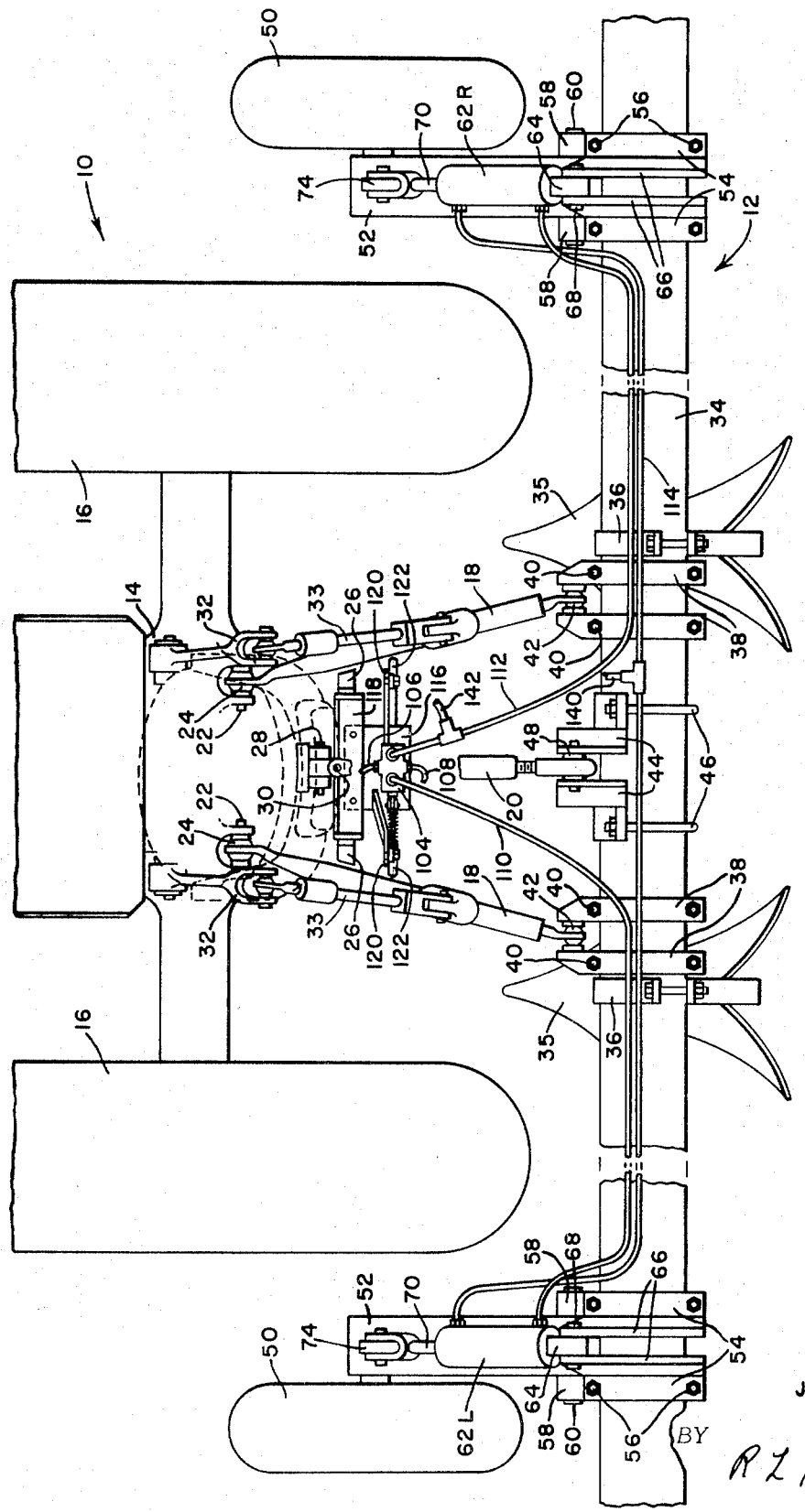
FIG. 1 is a top plan view of a tractor and implement arrangement embodying the side draft control system according to the present invention.
Figure 2:
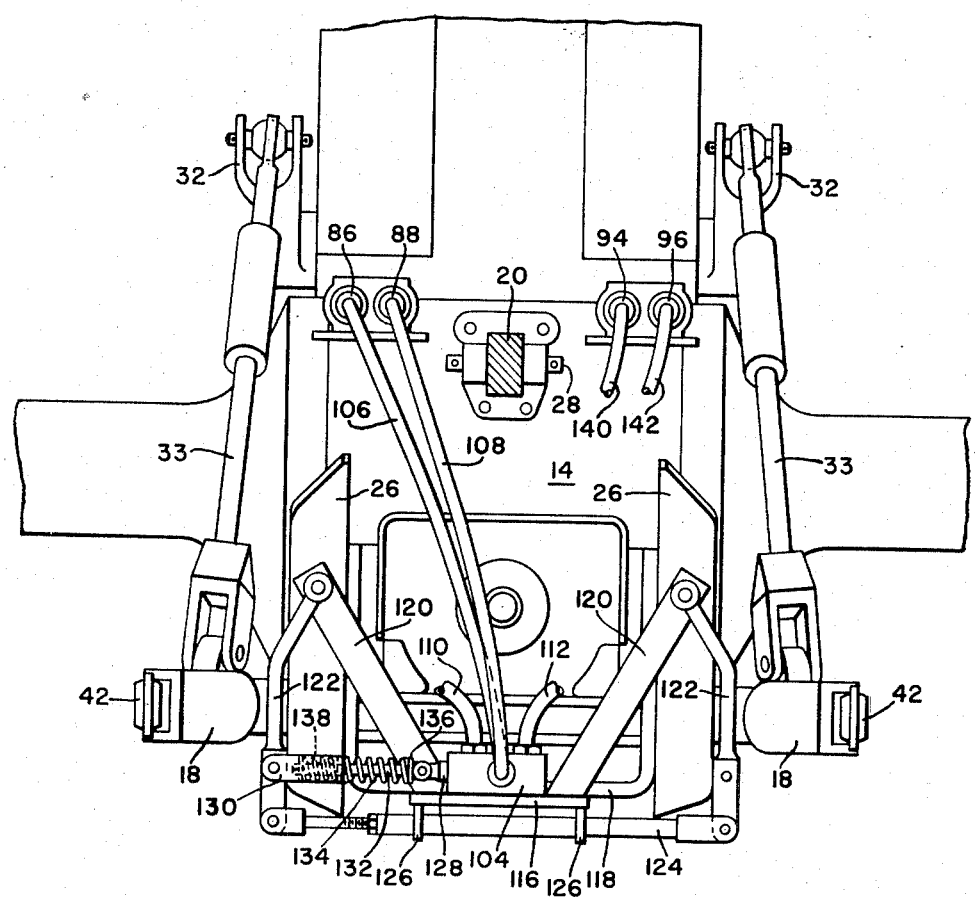
FIG. 2 is a rear elevational view of a portion of the tractor illustrated in FIG. 1.

Referring to the drawings, there is disclosed therein a tractor indicated generally at 10 and an implement indicated generally at 12. The tractor 10 is of conventional construction and includes a main chassis 14 supported by rear traction wheels 16 and front steerable wheels (undisclosed). The tractor also has a conventional three-point hitch including a pair of lower draft links 18 and an upper compression link 20. The draft links 18 are connected to a lower portion of the tractor chassis for limited universal movement by pins 22 and balls 24. Lateral movement of the draft links 18 is limited by conventional sway blocks 26. The forward end of the compression link 20 is connected to the tractor chassis for vertical pivotal movement about a first axis 28 and lateral pivotal movement about a second axis 30. The draft links 18 are interconnected with a pair of lift arms 32 by a pair of drop links 33. The lift arms 32 can be moved through a vertical range by a tractor-mounted cylinder (undisclosed) as is conventional to raise and lower the draft links 18.

The disclosed implement 12 includes a transversely elongated frame or toolbar 34 having a plurality of earth-working tools such as lister bottoms 35 secured thereto by clamps 36. For the purpose of simplification, only two lister bottoms are illustrated. A pair of brackets 38 are secured to the toolbar on each side of and equal distances from the fore-and-aft centerline of the tool-bar 34 by U-bolts 40. The forward ends of the brackets 40 are apertured and a hitch pin extends through the apertures in each pair of brackets and also through a hitch ball 42 on the rear end of one of the draft links to secure the implement to the draft links. A central mask in the form of a pair of upstanding posts 44 is secured to the center of the toolbar 34 by U-bolts 46 and the rear end of the compression link 20 is secured between the upper ends of the posts 44 by a pin and ball assembly 48.

The three-point connection between the tractor hitch and the implement provides an integral connection so that upon vertical movement of the tractor hitch, the implement is raised and lowered between transport and working positions.

The working position of the implement with respect to the ground surface is controlled by a pair of gauge wheels 50 which are mounted at the opposite ends of the toolbar 34. Each gauge wheel 50 is journaled to the lower free end of a wheel arm 52 which has its upper end pivotally connected to the toolbar 34 by a pair of brackets 54. Each pair of brackets 54 are secured to the toolbar in spaced relationship by U-bolts 56 and each bracket is provided with a bearing 58 on a forward portion thereof. A pivot shaft 60 journaled in the bearings of each pair of brackets 54 provides the pivotal mountings for the respective wheel arms 52.

The position of the toolbar 34 with respect to the gauge wheels 50 and the ground surface can be varied by a pair of double-acting hydraulic cylinders 62L and 62R. Each of the cylinders 62 has an anchor end 64 pivotally mounted between the upper ends of upwardly extending legs 66 of its respective pair of brackets 54 by a pivot pin 68. The rod 70 of a piston and rod assembly 72 extends from the opposite end of each cylinder 62 and is pivotally connected to a lug 74 secured to the wheel arm 52 adjacent the free end thereof. With this construction, it can be seen that extension of one of the cylinders will raise one side of the toolbar on its respective gauge wheel and change the working position of the one side of the toolbar with respect to the ground surface, and retraction of one of the cylinders will lower one side of the toolbar on its respective gauge wheel and vary the working position of the one side of the toolbar with respect to the ground surface.

Fluid is supplied to and exhausted from the hydraulic cylinders 62L and 62R by a conventional hydraulic system forming part of the tractor 10. The conventional tractor hydraulic system is illustrated schematically in FIG. 3 and includes a source of fluid pressure or pump 76, a fluid reservoir 78, a tractor-mounted four-way directional flow control valve 80, a pair of fluid lines 82 and 84 interconnecting the pump 76 and reservoir 78 with one side of the valve 80, and a pair of tractor-mounted remote function outlets 86 and 88 which are connected to the second side of the valve 80 by fluid lines 90 and 92. The illustrated tractor includes a second pair of tractor-mounted remote function outlets 94 and 96 which are connected to one side of a second tractor-mounted four-way directional flow control valve 98 by a pair of fluid lines 100 and 102. The opposite side of the valve 98 is interconnected with the pump 76 and reservoir 78 by the fluid lines 82 and 84.

The remote function outlets 86 and 88 are interconnected with one side of a mechanically-operated, spring centered, four-way directional flow control valve 104 by a pair of fluid lines 106 and 108. The opposite side of the valve 104 is interconnected with the anchor ends of the cylinders 62L and 62R by fluid lines 110 and 112. The rod ends of the cylinders 62L and 62R are interconnected by an additional fluid line 114.

When the tractor hydraulic system is to be used with the side draft control system according to the present invention, the valve 80 is moved to the right to interconnect the fluid line 106 with the pump 76 and the fluid line 108 with the reservoir 78. Fluid is then selectively and alternately supplied to and exhausted from the anchor ends of the cylinders 62L and 62R by movement of the valve 104 from its neutral position. The term "alternately" is used herein and in the claims to indicate that when one of the hydraulic cylinders is interconnected with the pump the other hydraulic cylinder is interconnected with the reservoir and vice versa. For example, if the valve 104 is moved to the right of its neutral position, it interconnects the anchor end of the cylinder 62L with the pump 76 and the anchor end of the cylinder 62R with the reservoir 78. This causes the left-hand side of the toolbar 34 to be raised on its gauge wheel and the right-hand side of the toolbar to be lowered an equal amount on its gauge wheel. With one side of the toolbar being raised and the other side being lowered, the average working position of the toolbar with respect to the ground surface is maintained substantially constant. Movement of the valve 104 to the left of its neutral position interconnects the anchor end of the cylinder 62R with the pump 76 and the anchor end of the cylinder 62L with the reservoir 78 so that the right side of the toolbar is raised and the left side of the toolbar is lowered.

The valve 104 is supported on a plate 116 which is secured to a drawbar support 118 on the rear of the tractor. Also supported by the plate 116 are a pair of elongated support arms 120 which diverge upwardly so that their upper ends are positioned directly rearwardly of the sway blocks 26. A pair of generally vertically extending actuating arms 122 have their upper ends pivotally connected to the upper ends of the support arms 120. The lower ends of the actuation arms 122 extend slightly below the plate 116 and are interconnected by a length adjustable link 124 so that the actuating arms 122 move in unison. A pair of guide lugs 126 are secured to the bottom of and extend downwardly from the plate 116. Although not discernible from the drawing, the lugs 126 each have a pair of spaced legs which extend on opposite sides of the link 124 to prevent any fore-and-aft movement of the arms 122 and link 124. The actuating arms 122 are shaped so that their upper portions extend outwardly toward the draft links and then the remainder thereof extend downwardly along the inner sides of the draft links 18 so that if either one of the draft links pivots inwardly toward its respective sway block, when the draft links are in their normal implement-working range, it will contact its respective actuating arm and move the actuating arms about their upper pivot.

The actuating arms 122 are interconnected with the valve stem 128 of the valve 104 by a resiliently extensible and retractable actuating link which has one end pivotally connected to the valve stem 128 and its opposite end pivotally connected to one of the actuating arms 122. The actuating link includes a U-shaped member 130 which has the ends of its legs pivotally connected to one of the actuating arms 122 and a rod 132 which has one end pivotally connected to the valve spool 128 and its opposite end extending through an aperture provided in the bight of the U-shaped member 130. A first coil spring 134 encircles the rod 132 and acts between the bight of the U-shaped member 130 and a stop 136 on the end of the rod near the valve spool. A second coil spring 138 encircles the rod 132 between the legs of the U-shaped member 130 and acts between the bight of the U-shaped member 130 and a nut on a threaded end of the rod 132. The two springs 134 and 138 normally maintain the actuating link at a fixed length, but should the actuating arms 122 move a distance greater than can be accommodated by the valve spool, the springs will yield to prevent damage to the valve.

The operation of the side draft control system thus far described is as follows. To start a pass through the field, the operator lowers the tractor hitch and hence the implement until the toolbar 34 is supported by the gauge wheels 50 and the tools 35 are working in the ground. As long as the draft forces on the opposite sides of the tractor hitch are equal, the side draft control system remains in the neutral condition illustrated in the drawings. However, should the draft forces on opposite sides of the tractor hitch become unbalanced due, for example, to the tools 35 on one side of the toolbar 34 working in harder ground than the tools on the other side, the draft link 18 on the high draft side of the implement will be forced against its sway block and actuate the valve 104. For example, if the lister bottoms 35 on the right-hand side of the toolbar 34 are working in harder ground than the lister bottoms on the left-hand side of the toolbar, the draft forces on the right-hand side of the tractor hitch will be greater than the draft forces on the left-hand side of the tractor hitch and the right-hand draft link 18 will be forced against its sway block. As the right-hand draft link 18 moves against its sway block 26, it pivots the right-hand actuating arm 122 to the left. The movement of the right-hand actuating arm 122 is transmitted to the valve 104 through the interconnecting link 124, the left-hand actuating arm 122 and the actuating link.

As the valve spool is moved to the left, it interconnects the anchor end of the cylinder 62R with the pump 76 and the anchor end of the cylinder 62L with the reservoir 78. As fluid from the pump 76 flows into the anchor end of the cylinder 62R, it forces fluid from the rod end of the cylinder 62R to the rod end of the cylinder 62L which in turn forces fluid from the anchor end of the cylinder 62L to the reservoir 78. Thus, as the cylinder 62R extends, the cylinder 62L is retracted an equal amount. Extension of the cylinder 62R raises the toolbar 34 so that the working depth of the tools 35 on the right-hand side of the toolbar is decreased and the draft forces on the right-hand side of the tractor hitch are decreased. As the right-hand side of the toolbar is raised by extension of the cylinder 62R, the left-hand side of the toolbar is lowered by retraction of the cylinder 62L so that the average working depth of all the tools 35 on the toolbar 34 remains substantially constant.

As the draft forces on the opposite side of the tractor hitch again approach a balanced condition due to the raising of the right-hand side of the implement and lowering of the left-hand side thereof, the draft link 18 on the right-hand side of the tractor hitch will move away from its sway block and the valve 104 will return to its neutral position. The side draft control system will then remain in the neutral condition until unbalanced draft loads are again encountered. When the implement is raised to a transport position by the power-operated tractor hitch, the draft links 18 move above the actuating arms 122 so that any lateral movement of the draft links 18 will not actuate the side draft control system.

Figure 3:
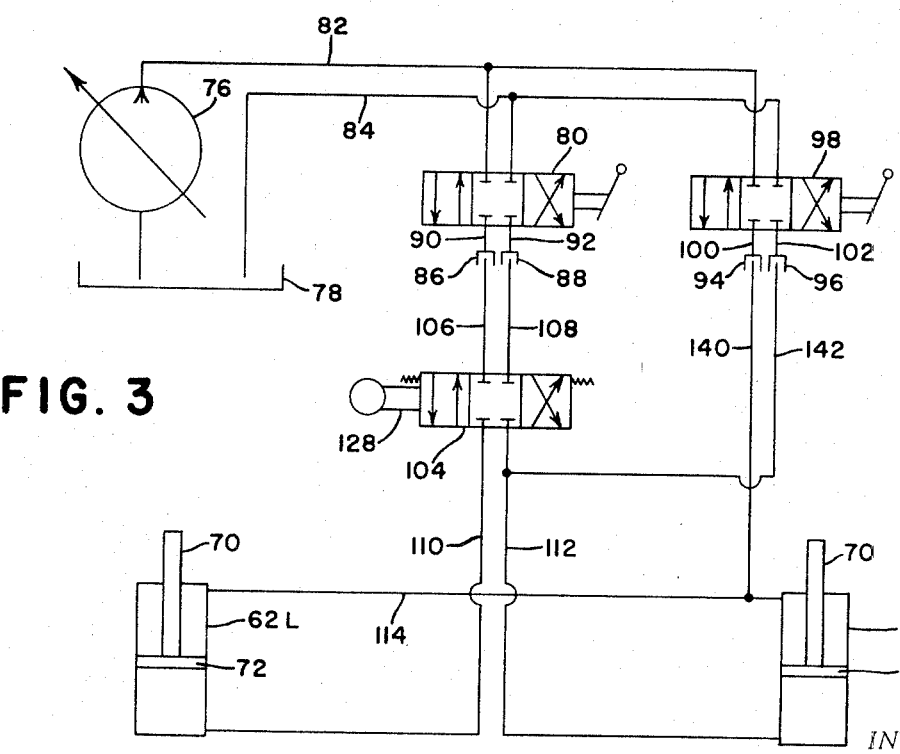
FIG. 3 is a schematic view of the hydraulic system employed in the present invention; and, FIG. 4 is a view similar to FIG. 3 but illustrating a modified hydraulic system.

During operation of the side draft control system, the average working position of the toolbar 34 relative to the ground or the average working depth of the tools remains constant due to one side of the toolbar 34 being raised as the other side of the toolbar 34 is lowered. However, it is often desirable to vary the average working position of the toolbar 34 with respect to the ground so that the working depth of the tools 35 is increased or decreased. This is accomplished by bypassing the valve 104 and interconnecting the opposite ends of one of the cylinders with the pump 76 and reservoir 78. This is accomplished in the manner illustrated in FIGS. 3 and 4. In FIG. 3, a pair of fluid lines 140 and 142 interconnect the remote function outlets 94 and 96 with the fluid lines 114 and 112 respectively. This in effect interconnects the remote function outlet 94 with the rod end of the cylinder 62R and the remote function outlet 96 with the anchor end of the cylinder 62R. When it is desired to lower the average working position of the toolbar 34, the valve 98 is moved to the right so that fluid from the pump 76 is forced to the rod end of the cylinder 62R and fluid from the anchor end of the cylinder 62R is returned to the reservoir 78. As the cylinder 62R retracts, the right side of the toolbar 34 is lowered and the draft forces on the right side of the tractor hitch increase which results in actuation of the valve 104 in the manner previously explained. However, with the valve 98 moved to the right, fluid from the pump 76 which passes through the valve 104 is returned to the reservoir 78 through the fluid line 142, and fluid flowing through the line 140 flows to the rod end of the cylinder 62L forcing fluid from the anchor end of the cylinder 62L back to the reservoir 78 through the valve 104 so that the cylinder 62L is also retracted. If it is desired to raise the average working position of the toolbar 34 with respect to the ground surface, the valve 98 is moved to the left so that both cylinders are extended.

Figure 4:
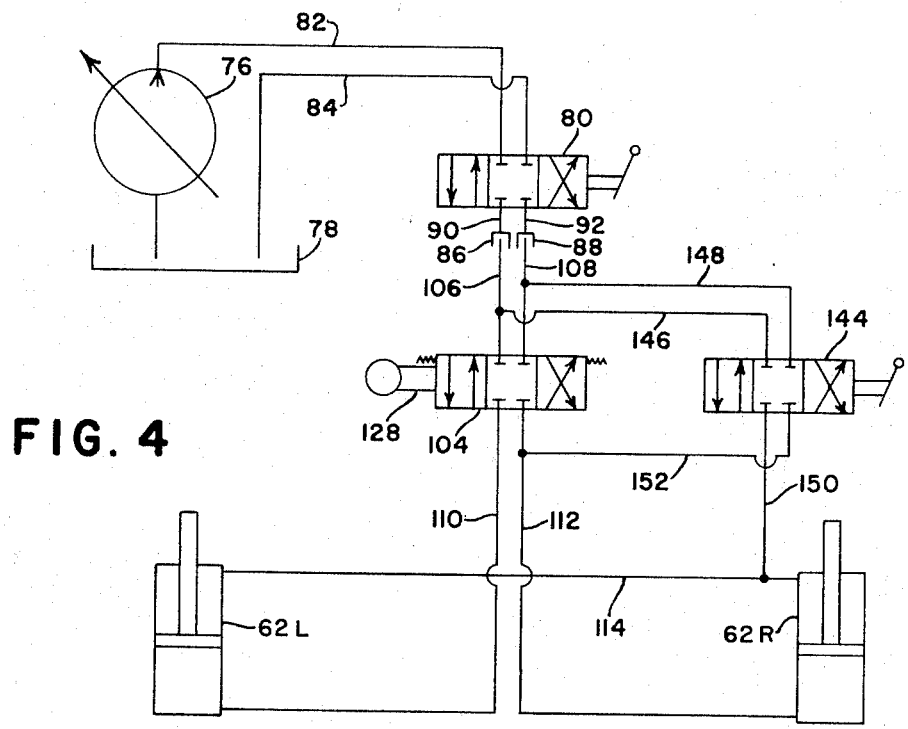

FIG. 4 illustrates the hydraulic system of the side draft control system as used on a tractor having only a single pair of remote function outlets 86 and 88. When the tractor has only a single pair of remote function outlets, it is necessary to make additional provisions for adjusting the average working position of the toolbar relative to the ground surface. This is accomplished by mounting a four-way directional flow control valve 144 on the tractor in a position near the operator's platform, interconnecting one side of valve 144 with the fluid lines 106 and 108 with an additional pair of fluid lines 146 and 148, and interconnecting the other side of valve 144 with the fluid lines 114 and 112 by fluid lines 150 and 152. The hydraulic system illustrated in FIG. 4 is essentially the same as that illustrated in FIG. 3 in that it provides a means of bypassing the valve 104 to interconnect the opposite ends of the cylinder 62R with the pump 76 and reservoir 78. The hydraulic system illustrated in FIG. 4 also operates in exactly the same manner as that illustrated in FIG. 3 and differs from the hydraulic system illustrated in FIG. 3 only in that it makes provision for the use of the side draft control system with a tractor having a hydraulic system with only a single pair of remote function outlets.

From the foregoing description of construction and operation, it can be seen that the present invention provides a means of maintaining balanced draft loads on a tractor and also of maintaining a constant average working depth of tools on an implement propelled by the tractor while maintaining the balanced draft loads.

Having thus described the construction and the operation of a preferred embodiment of the invention, various modifications within the spirit and scope of the invention will become apparent to those skilled in the art and can be made without departing from the underlying principles of the invention as defined in the claims.

I claim:

1. For use in a tractor and implement arrangement in which the tractor has a source of fluid pressure and the implement has a draft connection with the tractor, a side draft control system including a pair of gauge wheels on opposite sides of the implement for controlling the working position thereof, a pair of hydraulic cylinders connected between the frame and gauge wheels for varying the vertical position of the frame on the gauge wheels, and means including control means interconnecting the hydraulic cylinders and the source, characterized in that the control means is movable to either side of a neutral fluid blocking position to selectively interconnect one or the other of the hydraulic cylinders with the source, and sensing means on the tractor is operatively connected to the control means and responsive to unequal draft loads on opposite sides of the centerline of the tractor to move the control means from its neutral position in a direction to interconnect the hydraulic cylinder on the high draft side of the implement with the source to thereby maintain substantially equal draft forces on opposite sides of the centerline of the tractor.

2. For use with a tractor and implement arrangement in which the tractor has a source of fluid pressure, a fluid reservoir, and a hitch, and the implement includes a transversely elongated frame having a central draft connection with the tractor hitch and a plurality of earth-working tools secured to and depending from the frame, a side draft control system including a pair of gauge wheels adjustably secured to the frame on opposite sides of the center thereof, a hydraulic cylinder connected between each gauge wheel and the frame for vertically adjusting the frame on the gauge wheels, and means including valve means interconnecting the hydraulic cylinders with the source and reservoir, characterized in that the valve means is movable to either side of a neutral fluid blocking position to selectively and alternately interconnect the hydraulic cylinders with the source and the reservoir, and sensing means on the tractor is operatively connected to the valve means and responsive to unequal draft forces on opposite sides of the center of the implement frame to move the valve means from the neutral position in a direction to interconnect the hydraulic cylinder on the high draft side of the implement frame with the source and the hydraulic cylinder on the low draft side of the implement frame with the reservoir to thereby maintain substantially equal draft forces on opposite sides of the center of the implement frame and a substantially constant average working depth of the earth-working tools secured to the frame.

3. The side draft control system set forth in claim 2 wherein each of the hydraulic cylinders is double acting, each of the hydraulic cylinders has rod and anchor ends, the hydraulic cylinders are connected between the gauge wheels and frame to raise the frame upon extension, the rod ends of the cylinders are interconnected by fluid line means, and the valve means, when moved to either side of its neutral position, interconnects the anchor end of one of the hydraulic cylinders with the source and the anchor end of the other hydraulic cylinder with the reservoir.

4. For use with a tractor and implement arrangement in which the tractor has a source of fluid pressure, a fluid reservoir, and a power-operated hitch movable through a vertical range including a pair of lower draft links and an upper compression link pivotally connected to the tractor for limited universal movement, and the implement includes a transversally elongated frame integrally connected to the links and a plurality of earth-working tools secured to and depending from the frame, a side draft control system including a pair of gauge wheels adjustably secured to the frame on opposite sides of the hitch, a hydraulic cylinder connected between each gauge wheel and the frame for vertically adjusting the frame on the gauge heels, each of the hydraulic cylinders being double acting, having rod and anchor ends, and being connected between the frame and its respective gauge wheel to raise the frame with respect to the gauge wheel upon extension, characterized in that fluid line means interconnect the rod ends of the cylinders, means including valve means interconnect the anchor ends of the cylinders with the source and reservoir, the valve means is movable to either side of a neutral fluid blocking position to selectively and alternately interconnect the anchor ends of the hydraulic cylinders with the source and reservoir, and sensing means on the tractor is operatively connected to the valve means and responsive to lateral movement of at least one of the hitch links caused by unequal draft loads on opposite sides of the tractor hitch to move the valve means from its neutral position in a direction to interconnect the anchor end of the hydraulic cylinder on the high draft side of the implement frame with the source and the anchor end of the hydraulic cylinder on the low draft side of the implement frame with the reservoir to thereby maintain substantially equal draft loads on opposite sides of the tractor hitch and a substantially constant average working depth of the earth-working tools secured to the frame.

5. The side draft control system set forth in claim 4 wherein the sensing means is mounted on the tractor in a position to be contacted by at least one of the links and is operative only when the hitch links are in a lower portion of their vertical range of movement.

6. The side draft control system set forth in claim 5 wherein a pair of fluid lines bypass the first-mentioned valve means and interconnect the ends of one of the cylinders with the source and reservoir, and an additional valve means is interposed in the pair of fluid lines and is movable to either side of a neutral fluid blocking position to selectively and alternately interconnect the opposite ends of the one cylinder with the source and reservoir whereby the average working depth of the earthworking tools secured to the frame may be varied.

7. A side draft control system for use with a tractor-implement combination in which the tractor has a source of fluid pressure, a fluid reservoir, and a three-point hitch including a pair of lower draft links and an upper compression link mounted for limited universal movement, and the implement includes a frame connected to the tractor hitch, a pair of gauge wheels adjustably mounted adjacent the opposite sides of the frame for controlling the working position thereof, and a pair of hydraulic cylinders connected between the frame and gauge wheels for varying the vertical position of the frame with respect to the gauge wheels, the system comprising: a control valve interconnected with and controlling the flow of fluid to and from the reservoir and source; a pair of fluid lines interconnecting the hydraulic cylinders and the control valve; the control valve being movable to opposite sides of a neutral fluid blocking position to selectively and alternately interconnect the hydraulic cylinders with the source and reservoir; sensing means on the tractor to sense unequal draft loads on opposite sides of the tractor hitch, means operatively interconnecting the sensing means and control valve and responsive to the presence of unequal draft loads on opposite sides of the tractor hitch as determined by the sensing means to move the control valve from its neutral position in a direction to interconnect the hydraulic cylinder on the high draft side of the implement with the source and the hydraulic cylinder on the low draft side of the implement with the reservoir whereby a substantially constant average working position of the implement is maintained and substantially equal draft loads on opposite sides of the tractor hitch are maintained.

8. The side draft control system set forth in claim 7 wherein the sensing means is mounted on the tractor in a position to be contacted by at least one of the hitch links as the hitch links are moved laterally in response to unequal draft forces on opposite sides of the centerline of the implement.

9. The side draft control system set forth in claim 8 wherein each of the hydraulic cylinders includes a rod end and an anchor end, the pair of fluid lines interconnect the anchor ends of the cylinders with the control valve, a further fluid line interconnects the rod ends of the cylinders, an additional pair of fluid lines bypass the control valve and interconnect the ends of one of the cylinders with the source and reservoir, and a directional flow control valve is interposed in the additional pair of fluid lines and is movable to opposite sides of a neutral fluid blocking position to selectively and alternately interconnect the opposite ends of the one cylinder with the source and reservoir whereby the average working position of the implement can be varied.

10. A side draft control system for use with a tractor having a hydraulic system including a source of fluid pressure and a fluid reservoir, and a vertically movable and power-operated hitch including a pair of draft links pivotally connected to the tractor for limited universal movement, and an implement including a frame having a draft connection with the draft links, the system comprising: a pair of gauge wheels adjustably mounted on the implement frame on opposite sides thereof; a pair of hydraulic cylinders connected between the frame and gauge wheels to vary the vertical position of the frame with respect to the gauge wheels; valve means controlling the flow of fluid to and from the reservoir and source; a pair of fluid lines interconnecting the hydraulic cylinders with the valve means; the valve means being movable to opposite sides of a neutral fluid blocking position to selectively and alternately interconnect one hydraulic cylinder with the source and the other with the reservoir; sensing means mounted on the tractor in a position to be moved by the draft links as the draft links move laterally in response to unequal draft loads on opposite sides of the tractor hitch; transmitting means interconnecting the sensing means and valve means to transmit movement of the sensing means to the valve means to move the valve means from its neutral position in a direction to interconnect the hydraulic cylinder on the high draft side of the frame with the source and the hydraulic cylinder on the low draft side of the frame with the reservoir, whereby substantially equal draft forces are maintained on opposite sides of the tractor hitch and a substantially constant average working position of the frame is maintained.

11. The side draft control system set forth in claim 10 wherein the sensing means includes a pair of elongated generally vertically extending arms pivotally mounted on the tractor for lateral swinging movement, each of the arms is positioned closely adjacent one of the draft links, and rigid link means interconnect the arms whereby the arms move in unison when either arm is contacted by its respective draft link.

12. The side draft control system set forth in claim 11 wherein the valve means is mounted on the tractor adjacent one of the arms and the transmitting means includes link means interconnecting the one arm and the valve.

13. The side draft control system set forth in claim 12 wherein the last-mentioned link means is resiliently extensible and contractable.

14. The side draft control system set forth in claim 10 wherein each of the hydraulic cylinders is double acting and has rod and anchor ends, the pair of fluid lines interconnect the anchor ends of the cylinders with the valve means, a further fluid line interconnects the rod ends of the cylinders, an additional pair of fluid lines bypass the valve means and interconnect the ends of one of the cylinders with the source and reservoir, and a directional flow control valve is interposed in the additional pair of fluid lines and is movable to opposite sides of a neutral fluid blocking position to selectively and alternately interconnect one end of the one cylinder with the source and the other end of the one cylinder with the reservoir, whereby the average position of the frame with respect to the gauge wheels may be varied.

15. The side draft control system set forth in claim 11 wherein the arms are pivotally mounted adjacent one end in a position on the tractor to extend alongside the draft links only through the normal working range of the links whereby when the implement is raised by the tractor hitch to a transport position the side draft control system is inoperative.

* * * * *